United States Patent [19]

Collins

[11] 4,005,417
[45] Jan. 25, 1977

[54] FREQUENCY SPECTRUM ANALYZER

[75] Inventor: John D. Collins, Burlington, Mass.

[73] Assignee: Raytheon Company, Lexington, Mass.

[22] Filed: Aug. 14, 1975

[21] Appl. No.: 604,692

[52] U.S. Cl. .................. 343/5 SA; 343/5 DP; 343/17.2 PC; 324/77 B
[51] Int. Cl.² ............................ G01S 9/02
[58] Field of Search ....... 343/5 SA, 5 DP, 17.2 PC; 324/77 B, 77 C, 77 CS

[56] References Cited

UNITED STATES PATENTS

| | | | |
|---|---|---|---|
| 3,729,738 | 4/1973 | Cross et al. | 343/5 SA |
| 3,879,661 | 4/1975 | Collins | 343/5 SA X |
| 3,925,653 | 12/1975 | Otto | 324/77 B X |

Primary Examiner—T.H. Tubbesing
Attorney, Agent, or Firm—Richard M. Sharkansky; Philip J. McFarland; Joseph D. Pannone

[57] ABSTRACT

A frequency spectrum analyzer adapted for use in a real time signal processing radar system is disclosed. In such system a plurality of sets of radar returns, each one of such sets corresponding to radar returns from objects disposed in each one of a like plurality of range cells, is stored in a time compressor section, the radar returns in each one of the sets thereof being stored at the pulse repetition frequency (PRF) of such radar system. After storage of such radar returns, a like plurality of chirp pulses is produced, each one of such pulses having a dispersive time $K\tau$. Synchronously with each one of the chirp pulses, one of the plurality of sets of stored radar returns is retrieved from the time compressor section, in a time duration equal to $K\tau$. Each one of the retrieved sets of radar returns is mixed with a corresponding one of the plurality of chirp pulses to produce a series of mixed signals which is coupled to a pulse compressor. Each one of the mixed signals is compressed into a pulse occurring at a time related to the Doppler frequency of any object in the range cell producing such associated radar returns.

The time compressor section is used prior to pulse compression to effectively "match" the radar dwell time, generally several milliseconds in duration, to the dispersive time of the chirp pulse, generally several microseconds in duration, thereby enabling the pulse compressor to include a practical surface acoustic wave (SAW) delay line. Further, the "compressive" bandwidth, $\beta$, of the pulse compressor is equal to, or greater than, the dispersive bandwidth of the chirp pulses, thereby to maximize the power in the compressed pulses. Means are provided to adjust the dispersive time of the chirp pulse, thereby to correspondingly adjust the effective number of frequency resolution cells of the frequency spectrum analyzer.

10 Claims, 9 Drawing Figures

FREQUENCY SPECTRUM ANALYZER

BACKGROUND OF THE INVENTION

This invention relates generally to frequency spectrum analyzers and more particularly to analyzers of such type which are useful in real time signal processing.

As is known in the art, real time signal processors have been used extensively in many applications such as in sonar and radar. For example, a real time signal processor may be used in a radar receiver for determining the Doppler frequency associated with a detected target. In such a radar receiver a bipolar video signal is produced in response to each one of a train of transmitted pulses. Such pulses are transmitted at a predetermined pulse repetition frequency, or "PRF". A predetermined time after each one of the pulses in the train thereof is transmitted, the bipolar video signal is sampled and stored to obtain a set of samples of such signal, each sample in the set thereof corresponding to a return within a particular one of a number of range cells. The rate of change in amplitude of the samples within each one of the range cells is indicative of the Doppler frequency of any object in each one of the range cells. As is known, such Doppler frequency may be obtained by passing each set of samples through a frequency spectrum analyzer. The described real time signal processing has been implemented using various analog and digital processing apparatus. However, such implementations generally require relatively complex and costly components.

As is described in articles entitled "High-Speed Spectrum Analyser Using a Pulse Compression Technique" by J. A. Edwards and M. J. Withers, published in the Proceedings of the IEE, Vol. 114, No. 11, November 1967 and "The Design and Application of Highly Dispersive Acoustic-Surface Wave Filters" by H. M. Girard, W. R. Smith, W. R. Jones and J. B. Harrington published in IEEE Transactions on Microwave Theory and Techniques, Vol. MTT-21, No. 4, April 1973, the frequency of an input signal may be determined by mixing such input signal with a linear frequency modulated (FM) signal, i.e. a "chirp" pulse, then passing the resulting signal through a pulse compression filter, and finally measuring the time of occurrence of the compressed pulse produced by such pulse compression filter relative to a reference time, $t_0$. Thus, if the frequency of the input signal is zero, the compressed pulse occurs at the reference time $t_0$, but if the frequency of the input signal is $f_d$, the compressed pulse occurs at a time $f_d/S$ after the reference time $t_0$, where S is the ratio of the change in the frequency of the chirp pulse (i.e. dispersive bandwidth) to the chirp pulse time duration (i.e. the dispersive time).

In such a system the input signal, the frequency spectrum of which is to be analyzed, is swept over a range of frequencies $2\Delta f$ (chirp pulse dispersive bandwidth) in a time duration $2\Delta T$ (the chirp pulse dispersive time) where $\Delta f$ is the frequency bandwidth of such input signal. The pulse compression filter has a compressive bandwidth also equal to $\Delta f$ and a compressive time equal to $\Delta T$. Because the input signal is swept over a bandwidth greater than the compressive bandwidth of the pulse compression filter, here 2:1 greater, a 3 db loss in power in the compressed pulse will result, thereby reducing the signal to noise (S/N) ratio of the received signal if such technique were used in a radar system. In order for the chirp pulse and the input signal to be properly mixed, the chirp pulse must occur during the time of the input signal. Further, in order to properly pulse compress the mixed signals, the ratio of the dispersive bandwidth to the dispersive time (i.e. the ratio S) must be equal in magnitude to the ratio of the compressive bandwidth to the compressive time of the pulse compression filter. Therefore, if such a system were to be used in a pulse Doppler radar, where the input signal is the bipolar video signal comprised of a number of radar returns (say 64 radar returns) taken at the radar PRF rate, say (1/200) MHz, a dispersive time of several milliseconds would be required for the chirp pulse. As is known in the art one convenient pulse compression filter includes a surface acoustic wave (SAW) delay line. In order to pulse compress a signal having several milliseconds time duration such SAW delay line would require a length in the order of several feet thereby making use of such SAW delay line impractical in a pulse Doppler radar.

SUMMARY OF THE INVENTION

With this background of the invention in mind it is an object of this invention to provide an improved signal processor suitable for real time signal processing.

It is another object of this invention to provide an improved real time signal processor adapted for use in a pulse Doppler radar.

It is another object of this invention to provide an improved frequency spectrum analyzer adapted for use in a radar system.

These and other objects of the invention are attained generally by providing: time compression means for storing N samples of a signal at a rate $R_1$, such samples being taken in a time duration $T_1$ and for retrieving such N stored samples at a different higher rate $R_2$, in a time duration $T_2$ to derive a time compressed signal; means for producing a frequency modulated signal having the time duration $T_2$; means for mixing the time compressed signal and the frequency modulated signal during the time duration $T_2$ to derive mixed signals; and means for pulse compressing the mixed signals.

In a preferred embodiment, the frequency modulated signal is a chirp pulse having a dispersive bandwidth $K\beta$ and a dispersive time $K\tau$ and the pulse compressor includes a surface acoustic wave (SAW) delay line having a compressive bandwidth $\beta$ and a compressive time $\tau$ where K is less than or equal to 1. The time compressor means compresses N samples of the bipolar signal having a bandwidth, $\Delta f$, from a time duration $T_1$ to a shorter time duration equal to the dispersive time of the chirp pulse, $K\tau$, generally in the order of several microseconds, and also alters the bandwidth of such video signal from the bandwidth $\Delta f$ to a time compressed bandwidth $(R_2/R_1)\Delta f$. In this way: (1) the time compressor means is used, prior to pulse compression, to effectively match the radar dwell time, $T_1$, to the dispersive time of the chirp pulse $K\tau$, thereby enabling the use of relatively short SAW delay lines for the pulse compressor; and, (2) the compressive bandwidth of the pulse compressor, $\beta$, is equal to, or greater than, the dispersive bandwidth of the chirp pulse so that all frequency components of the time compressed signal within a bandwidth $\beta(1-K)$ will fall within the compressive bandwidth $\beta$ of the pulse compressor, thereby to maximize the power in the time compressed pulse.

BRIEF DESCRIPTION OF THE DRAWINGS

The above-mentioned and other features of the invention will become more apparent by reference to the following description taken in connection with the accompanying drawings in which.

DESCRIPTION OF THE PREFERRED EMBODIMENTS

General

Figure 1:
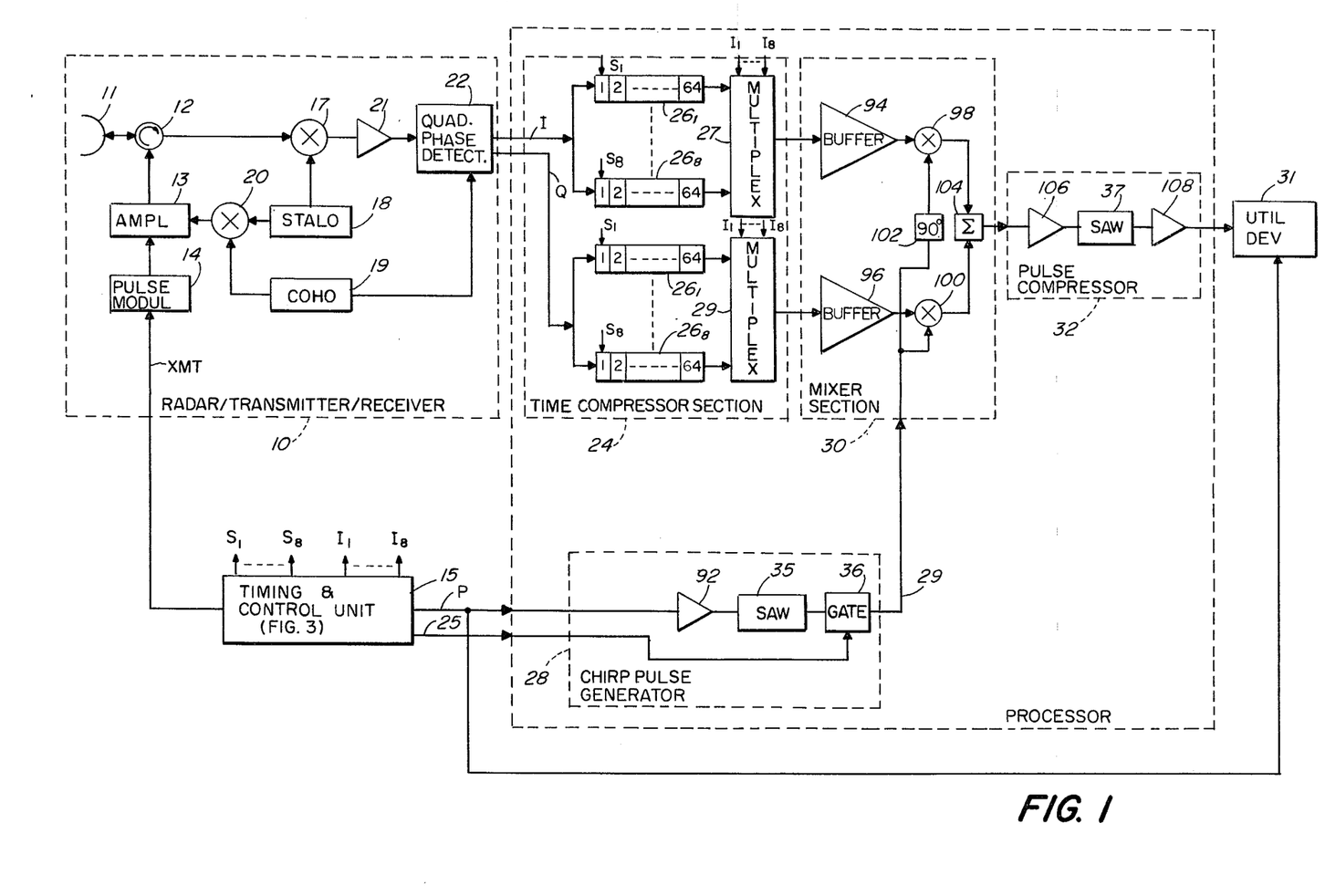
FIG. 1 is a block diagram of a pulse Doppler radar incorporating my invention.
Figure 2A:
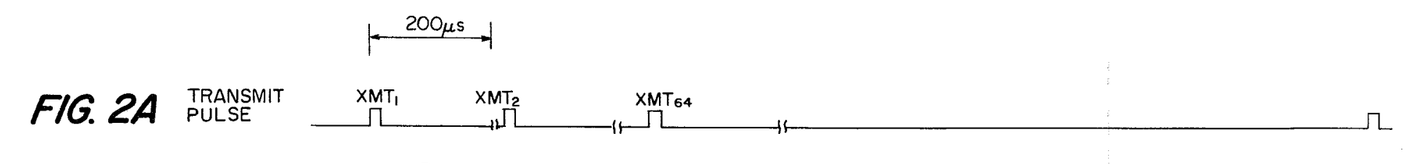
FIGS. 2A to 2F are timing diagrams useful in understanding the operation of the radar systems shown in FIG. 1.
Figure 2B:
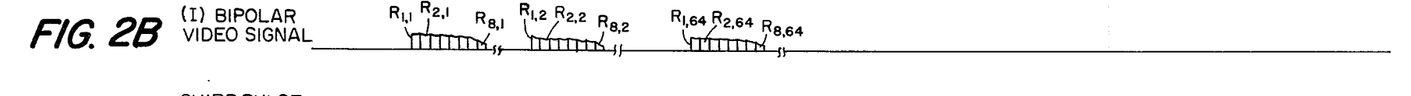

Referring now to FIG. 1, a coherent pulse Doppler radar system is shown. The transmit/receive section 10 of such radar system is conventional, including an antenna 11 coupled through circulator 12 to an amplifier, here a klystron amplifier 13, and pulse modulator 14. Pulse modulator 14, in response to signals supplied thereto via line XMT from timing and control unit 15 (the details of which will be described in connection with FIG. 3), produces a train of pulses of radio frequency energy at a desired PRF, here (1/200) MHz. Each one of the pulses in the train of transmitted pulses is reflected by various objects (not shown) which are disposed over various ranges from the antenna 11. A portion of the reflected energy produced in response to each transmitted pulse is received by antenna 11. The time at which a portion of such energy is received relative to the time at which the transmitted pulse associated therewith is transmitted corresponds to the range of the object causing such portion of the received energy. The energy received by antenna 11 passes through circulator 12. The signal at the output of circulator 12 is heterodyned in a conventional manner in mixer 17 with a signal produced by a stable local oscillator (STALO 18). The signal produced by STALO 18 is heterodyned with a signal produced by a coherent oscillator (COHO 19) in a mixer 20 to produce the train of transmitted pulses after amplification by the klystron amplifier 13 in a conventional manner. The signal produced at the output of mixer 17 is passed through an IF amplifier 21 to a quadrature phase detector 22. As indicated, quadrature phase detector 22 responds in a conventional manner to thereby provide in-phase and quadrature bipolar video signals, such signals being separated into in-phase and quadrature channels I, Q, respectively. The relationship between the transmitted pulses and the bipolar video signal in the in-phase channel, I, is shown in FIGS. 2A and 2B, it being understood that the quadrature dipolar video signal behaves in an equivalent manner. The in-phase and quadrature bipolar video signals are applied to a time compressor section 24 as shown in FIG. 1. Time compressor section 24 includes two sets of eight analog delay lines $26_1$—$26_8$ as shown, one set being disposed in the in-phase channel, I, and the other set being disposed in the quadrature channel, Q. Each one of the delay lines $26_1$–$26_8$ in each one of the two sets thereof here is a charged coupled device (CCD), as a SAM 64 Serial Analog Memory manufactured by Reticon Corporation, 450 E. Middlefield Rd., Mountain View, Calif. 94043. The analog delay lines $26_1$–$26_8$ in each one of the two sets thereof is identical in construction so that the processing of data associated at the in-phase channel will now be described it being understood that the processing of the data associated with the quadrature channel in the time compressor section 24 is equivalent to such in-phase channel. The set of delay lines coupled to the in-phase channel, I, includes eight delay lines $26_1$–$26_8$ the number of such delay lines being selected in accordance with the desired number of range cells to be used by the radar system. Here eight range cells are used in the radar system. Each one of the delay lines $26_1$–$26_8$ has here 64 serially coupled stages, as indicated. The number of stages is selected in accordance with the desired Doppler frequency resolution. Also, each one of the delay lines $26_1$–$26_8$ has a different shift signal line $S_1$–$S_8$ coupled thereto as indicated. In response to the shift signals applied to a selected one of the shift signal lines $S_1$–$S_8$ by timing and control unit 15 in a manner to be described, data applied to each one of the delay lines $26_1$–$26_8$ (in each one of the two sets thereof) is stored only in the first stage of the particular one of the delay lines which is actuated by the selected shift signal line $S_1$–$S_8$. At the same time the contents of each stage of the selected one of the delay lines are shifted to the next stage to the right. That is, such analog delay lines $26_1$–$26_8$ act in a manner analagous to a binary shift register in storing and shifting data. As will become apparent hereinafter, in referring to FIGS. 2A and 2B, after 64 radio frequency (RF) pulses ($XMT_1$–$XMT_{64}$) have been transmitted by the radar system, delay lines $26_1$ through $26_8$ in each one of the two sets thereof will have stored in stages 64 through 1 thereof radar returns $R_{1,1}$–$R_{1,64}$ through $R_{8,1}$–$R_{8,64}$ respectively, where the term $R_{m,n}$ is used to designate a radar return from the mth range cell, such return being associated with the nth transmitted pulse, as indicated in FIG. 2B. That is, each one of the two sets of delay lines $26_1$–$26_8$ has 64 radar returns stored therein at the radar PRF, here (1/200) MHz, the contents of corresponding pairs of delay lines being representative of radar returns in a different range cell.

Figure 2C:
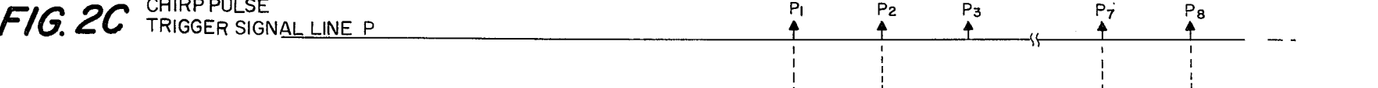
Figure 2D:
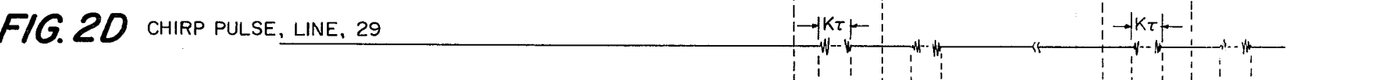
Figure 2E:
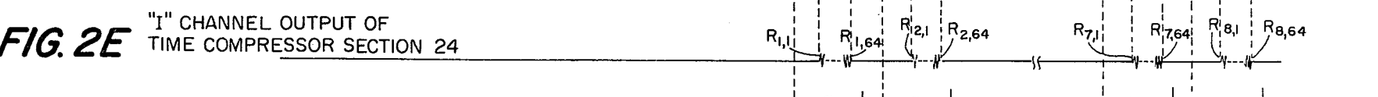
Figure 2F:
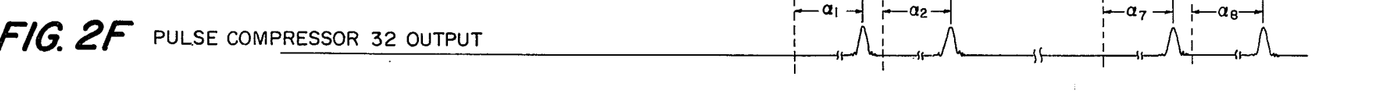

After the returns $R_{1,1}$–$R_{8,64}$ from 64 transmitted pulses have been stored in the two sets of delay lines $26_1$–$26_8$ as described, timing and control unit 15 transmits a series of eight chirp pulse trigger signals $P_m$ (where $m$ equals 1 through 8) via line P to the chirp pulse generator 28 and to the utilization device 31. Suffice it to say here that the chirp pulse generator section 28 includes an amplifier 92, a surface acoustic wave (SAW) delay line 35 and a gate 36. In response to each one of the chirp pulse trigger signals $P_m$, an amplitude weighted chirp pulse having a dispersive time ($K\tau$), here 12.8 microseconds, as produced by the chirp pulse generator 28 on line 29 as indicated in FIGS. 2C and 2D. Here each one of such chirp pulses is a pulse linearly frequency modulated from 57.5 MHz. to 62.5 MHz. Therefore a series of chirp pulses is produced, each one having a 5 MHz dispersive bandwidth ($K\beta$). At the time each one of such chirp pulses is produced by the chirp pulse generator 28, signals are supplied by timing and control unti 15 to the time compressor section 24 to enable 64 radar returns $R_{m,1}$–$R_{m,64}$, associated with one of the eight range cells, to be read therefrom at a retrieval rate of 5 MHz as indicated in FIG. 2E. Therefore, the time compressed Doppler bandwidth is $10_3 \Delta f$, where $\Delta f$ is the Doppler bandwidth of the bipolar video signal fed to the time compressor section 24 and $10_3$ is the ratio of the retrieval rate, 5 MHz, to the radar PRF (1/200) MHz. As shown in FIGS. 2C through 2F, after the radar returns $R_{1,1}$–$R_{8,64}$ have been stored in the time compressor section 24 as described, a first chirp trigger signal $P_1$ is transmitted from the timing and control unit 15 to the chirp pulse generator 28; an enabling signal is transmitted on line $I_1$ to selectively couple delay line $26_1$ to the mixer section 30; and shift signals at the 5 MHz rate are transmitted on line $S_1$ thereby to enable the 64 returns $R_{1,1}$–$R_{1,64}$ stored in the delay line $26_1$ to be serially read therefrom as indicated in FIG. 2E. Simultaneously with the reading of radar returns $R_{1,1}$–$R_{1,64}$ from the delay line $26_1$, the chirp pulse generator 28 produces the chirp pulse described above. Consequently, the 64 radar returns $R_{1,1}$–$R_{1,64}$ and the chirp pulse are supplied to the mixer section 30 during the identical time period i.e., the chirp pulse dispersive time $K\tau$, here 12.8 microseconds. The signal produced at the output of mixer section 30, the details of which will be described hereinafter, is presented to a pulse compressor 32, the details of which will also be discussed later. Suffice it to say here, however, that the pulse compressor 32 serves as a pulse compression filter having a compressive bandwidth $\beta$, and compressive time $\tau$, the ratio of $\beta/\tau$ being equal in magnitude to the ratio of the dispersive bandwidth ($K\beta$) to the dispersive time ($K\tau$) of the chirp pulse. The pulse compressor 32 includes the SAW delay line 37 here having a compressive bandwidth $\beta$ equal to 10 MHz and a compressive time $\tau$ equal to 25.6 microseconds. Pulse compressor 32 produces, in response to each one of the mixed signals applied thereto, a compressed pulse or dechirped signal, the peak of which occurs at a time $\alpha_1$ after the chirp trigger signal $P_1$ as indicated in FIG. 2F. As is known, the time $\alpha_1$ is related to the Doppler frequency of an object disposed in the range cell producing the returns $R_{1,1}$–$R_{1,64}$. A short time after the first chirp trigger signal $P_1$ has been supplied to the chirp pulse generator 28, a second chirp pulse trigger signal $P_2$ is applied to such chirp pulse generator 28. Timing and control unit 15 then produces a signal on line $I_2$ to: selectively coupled delay lines $26_2$ through multiplexers 27, 28 to the mixer section 30; and to supply signals to line $S_2$ at the 5 MHz rate to enable the 64 radar returns $R_{2,1}$–$R_{2,64}$ to be read from such delay line $62_2$ during a time period equal to the dispersive time $K\tau$. Likewise, the chirp pulse produced by the chirp pulse generator 28 in response to the trigger signal $P_2$ is also produced during the time at which the samples $R_{2,1}$–$R_{2,64}$ are being retrieved from the time compressor section 24. As indicated in FIG. 2F, an object disposed in the range cell associated with the returns $R_{2,1}$–$R_{2,64}$ would have a Doppler frequency related to the time $\alpha_2$. This process is repeated to enable the radar returns stored in each one of the delay lines to be read therefrom. A utilization device 31, here a conventional analog display device responsive to the chirp pulse trigger signals produced by the timing and control unit 15 is used to display the output of the pulse compressor as shown in FIG. 2F thereby to enable an observer of such display to identify and determine the Doppler frequency of each one of the objects disposed in each one of the eight range cells.

Timing and Control Unit 15

Figure 3:
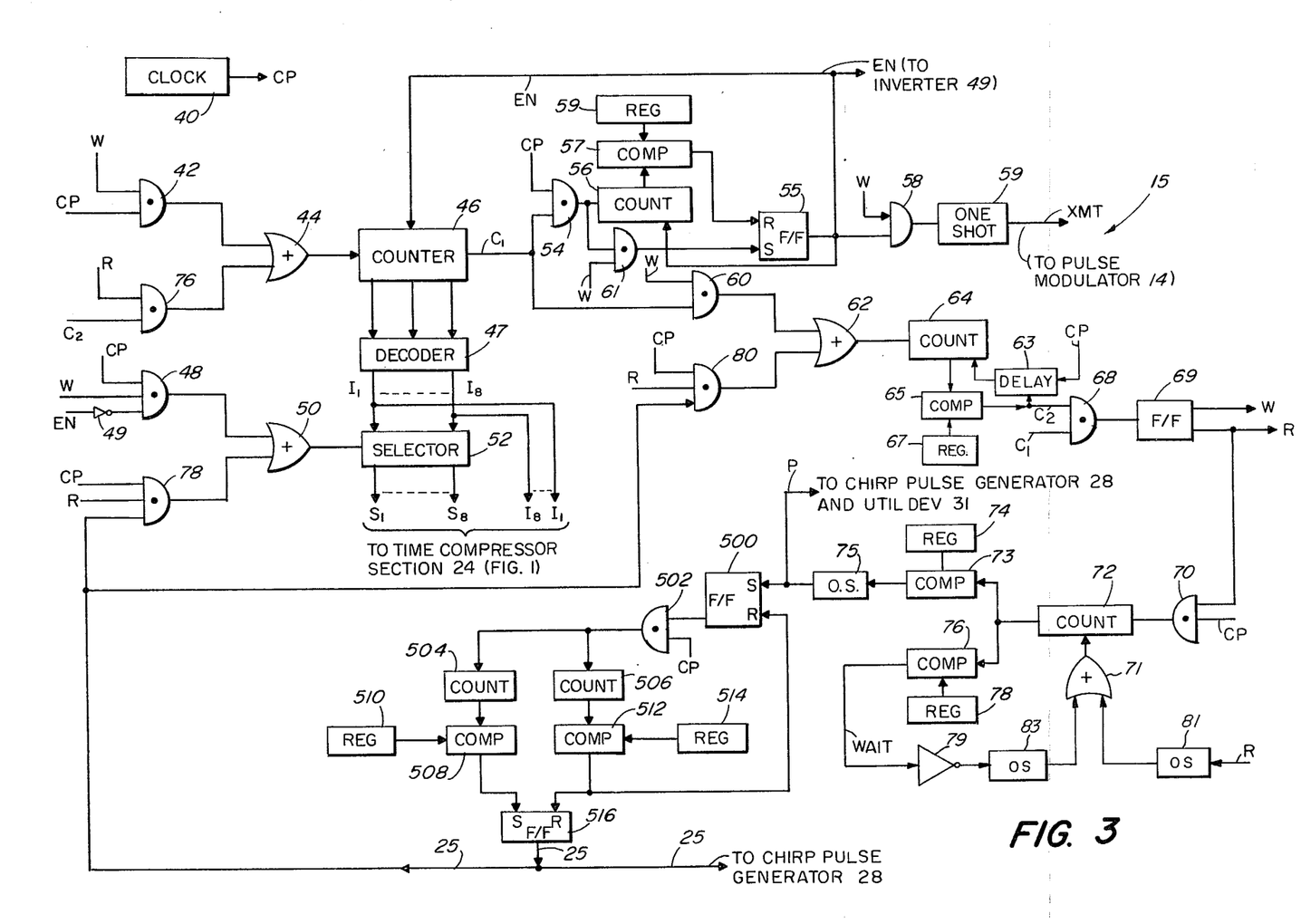
FIG. 3 is a block diagram of a timing and control unit used in the radar system shown in FIG. 1.

Timing and control unit 15 is shown in FIG. 3 to include a clock 40, here adapted to produce clock pulses on line cp at a rate here 5 MHz. As will be seen, timing and control unit 15 alternates or "oscillates" between a "write in" mode, as when the signal on line W is "high" to enable radar returns $R_{m,n}$ to be stored in the pulse compressor section 24 (FIG. 1) and a "read out" mode as when the signal on line R is high to enable such stored radar returns $R_{m,n}$ to be read therefrom in the manner described above.

Let us assume that the timing and ontrol unit 15 is initially in the write in mode as by setting flip/flop 69 by any conventional means not shown to produce a high signal on line W. Clock pulses on line cp will then pass through AND gate 42 through OR gate 44 to counter 46. Counter 46 is a conventional 3 bit, divide by 8 counter, the output of which is coupled to a conventional decoder 47. Decoder 47 raises the level of one of the output lines $I_1$–$I_8$ thereof selectively in response to the digital word stored in the counter 46. Clock pulses passing through AND gate 48 (line EN being low for reasons to become apparent) and OR gate 50 are supplied to a conventional selector 52. Such selector 52 passes the signals applied thereto via OR gate 50 to a selected one of the shift signal lines $S_1$–$S_8$, such lines being selected by the decoder 47. In operation and referring also to FIG. 4, in response to the first eight clock pulses on line cp counter 46 varies from $(0)_{10}$ to $(7)_{10}$ and clock pulses pass to lines $S_1$–$S_8$ respectively thereby enabling radar returns $R_{1,1}$–$R_{8,1}$ to become stored in the first stage of the delay lines $26_1$–$26_8$ respectively as described above. It is here noted that if the delay lines $26_1$–$26_8$ are the type which require two phase shift signals, a bistable multivibrator with appropriate change in the clock frequency may be arranged in any conventional manner and used to provide such shift signals.

On the ninth clock pulse the overflow line $C_1$ of the counter 46 becomes high and a clock pulse is enabled to pass through AND gate 54 to a counter 56 and through AND gate 61 to set a flip/flop 55 and also counter 46 is reset to $(0)_{10}$. The counter 56 is also connected to a comparator 57 to which a register 59 is also coupled. The register 59 here has the number $(993)_{10}$ stored therein. When the content of the counter 56 is greater than, or equal to, $(993)_{10}$, i.e. 198.6 microseconds after the line $C_1$ is raised to high, the output of comparator 57 becomes high, thereby to reset the flip/flop 55. The output of flip/flop 55 is coupled via line EN to counter 46, AND gate 58 and inverter 49. When the signal on line EN is high: (1) counter 46 is disabled from counting clock pulses supplied thereto via OR gate 44, and (2) inverter 49 inhibits clock pulses from passing through selector 52. Also when such line EN goes from a high level to a low level, counter 56 is reset. Further, when line EN goes high a high signal passes through AND gate 58 to enable one shot multivibrator 59 to transmit a pulse on line XMT to pulse modulator 14 (FIG. 1). The high signal on line $C_1$ passes through AND gate 60 and OR gate 62 to a counter 64. A comparator 65 is coupled between counter 64 and a register 67, here storing $(63)_{10}$. The process repeats until the level on line $C_1$ goes high 64 times thereby raising the level on line $C_2$ to reset counter 64 after a one clock pulse delay provided by delay 63. Because the line $C_1$ is also high at this time, a high signal is produced at the output of AND gate 68 thereby switching the state of flip/flop 69 (i.e. to raise the line R and to lower the line W) placing the timing and control unit 15 in the "read out" mode.

During the read out mode a high signal on line R passes through AND gate 70 to enable clock pulses to pass through such AND gate to counter 72 and through OR gate 71 via monostable multivibrator 81 to reset counter 72 when the signal on line R goes from a low to a high. A comparator 73 is coupled to such counter 72 and also to a register 74, such register having stored therein $(1)_{10}$. The comparator 73 produces a high signal at the output thereof when the contents of the counter 72 are greater than $(1)_{10}$. It follows then that when the line R goes high a high signal is produced at the output of comparator 73 after one clock pulse has passed to counter 72. The output of comparator 73 is coupled to a one shot multivibrator 75 here designed to produce a 41.6 ns pulse on the line P. The selection of a 41.6 ns pulse width will be described hereinafter. Suffice it to say here that such pulse is the chirp pulse trigger signal, as described above.

Figure 4:
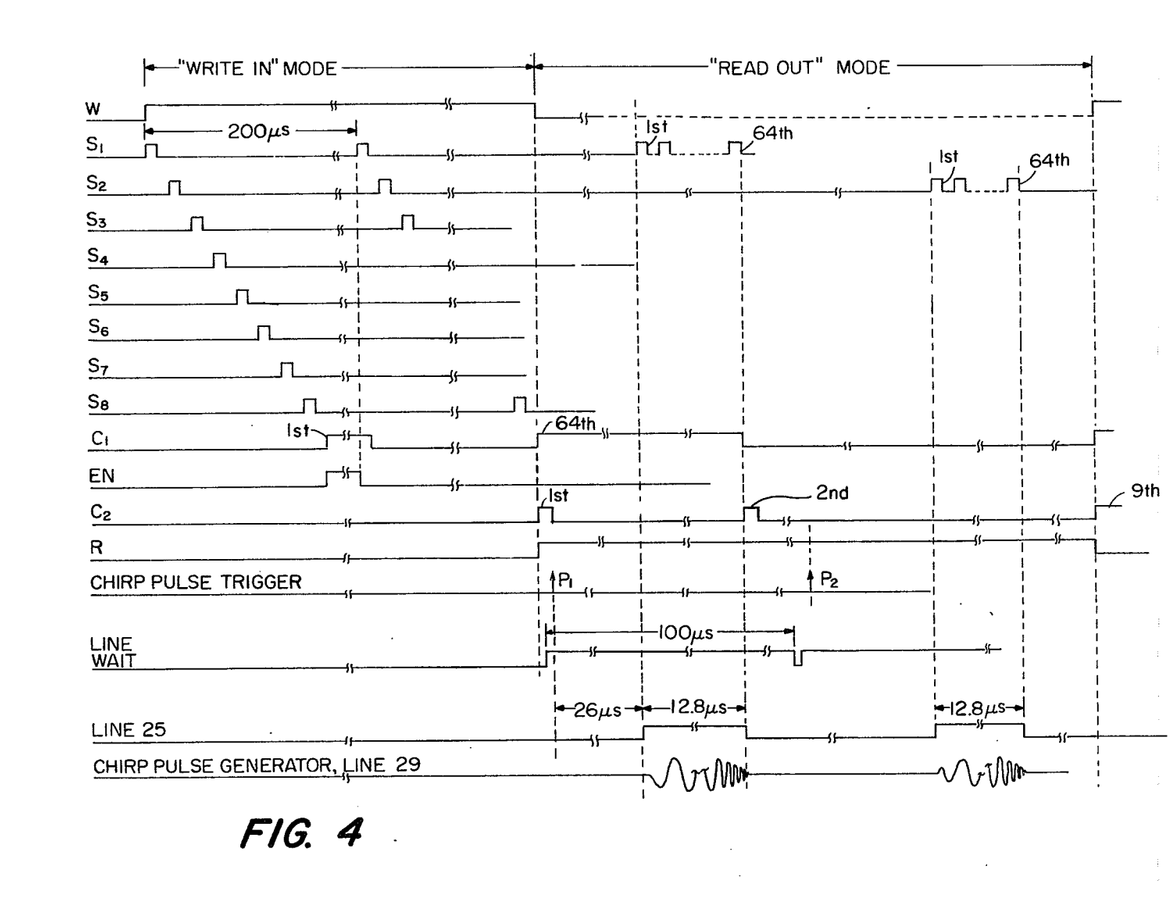
FIG. 4 is a series of timing diagrams useful in understanding the operation of the timing and control unit shown in FIG. 3.

The chirp pulse trigger signal $P_1$ sets a flip/flop 500. In response thereto, a high signal is produced by such flip/flop 500 to enable clock pulses to pass through AND gate 502 to counters 504, 506. A comparator 508 is coupled to the output of counter 504. Also coupled to such comparator 508 is a register 510, here having $(130)_{10}$ stored therein. Counter 506 has the output thereof coupled to a comparator 512. Also coupled to such comparator 512 is a register 514, here having stored therein $(194)_{10}$. When the contents of counter 504 are greater than, or equal to, $(130)_{10}$ a flip/flop 516 becomes set and the output thereof, that is the signal on line 25, goes high. When the contents of counter 506 are equal to or greater than $(194)_{10}$ the output of comparator 512 goes high thereby to reset flip/flop 516 causing line 25 to go low and also to reset flip/flop 500. The signal produced on line 25 is shown in FIG. 4. As will become apparent, the signal on line 25 serves to enable reading of the stored radar returns associated with the first range cell $R_{1,1}$–$R_{1,64}$ and also to gate a chirp pulse generated by the SAW 35 to the output of the chirp pulse generator 28, FIG. 1. That is, the time interval in which line 25 is high is equal to the dispersive time of the chirp pulse and also equal to the time during which 64 radar returns are retrieved from the time compressor section 24.

When the line 25 is high during the read out mode, clock pulses pass through AND gate 78, OR gate 50 to the selector 52. Counter 46 stores $(0)_{10}$. It follows then that 64 clock pulses are passed over line $S_1$ thereby retrieving the 64 radar returns $R_{1,1}$–$R_{1,64}$ associated with the first range cell and stored in the pair of delay lines $26_1$. After such 64 clock pulses have been passed to counter 64, comparator 65 goes high (because the contents are greater than or equal to the contents stored in register 67) and line $C_2$ goes high thereby passing through AND gate 76 and OR gate 44 to increment counter 46 by one thereby to lower $C_1$ and also after a 1 clock pulse delay to reset counter 64. It is noted that, as described above, during this period of time the radar returns $R_{1,1}$–$R_{1,64}$ are read and a chirp pulse is applied to the mixer section 30 along with such 64 radar returns, as also indicated in FIGS. 2D and 2E.

The output of counter 72 is also coupled to a comparator 76. Also coupled to such comparator 76 is a register 78 here having stored therein $(500)_{10}$. The comparator 76 produces a high signal at its output when the contents of counter 72 are less than, or equal to, $(500)_{10}$. Therefore, the signal on line WAIT (the output of comparator 76) goes high (a relatively short time after counter 72 is reset by the signal on line R, as described) and remains high for 100 microseconds after which it goes low. The signal at the output of inverter 79 then goes from a low to a high and a pulse is produced by monostable multivibrator 83 to reset counter 72. Referring also to FIGS. 3 and 4, when the signal on line WAIT acts to reset counter 72 then the output of the comparator 73 goes high 1 clock pulse after such counter 72 has been reset. When the output of comparator 73 goes high, the chirp trigger signal is again produced by one shot multivibrator 75 (chirp trigger pulse $P_2$). The output of flip/flop 516 (i.e. line 25) goes high for a 12.8 microsecond time duration during which time radar returns $R_{2,1}$–$R_{2,64}$ are retrieved from the pair of delay lines $26_2$ and a second chirp pulse is produced by the chirp pulse generator 28. This process continues until line $C_2$ goes high for the ninth time at which time line $C_1$ also goes high thereby to change flip/flop 69 and place the timing and control unit 15 in the write in mode once again.

Pulse Generator 28

The 41.6 ns chirp pulse supplied to the chirp pulse generator 28 via line P from the one shot multivibrator 75 of timing and control unit 15 is amplified in amplifier 92 and then passed to a surface acoustic wave (SAW) delay line 35. Here such surface acoustic wave (SAW) delay line 35 has a 10 MHz bandwidth and generates a linear frequency modulated chirp pulse having a time duration or dispersive time of 25.6 microseconds. The 41.6 nanosecond pulse produced by the one shot multivibrator is selected in order to stimulate the surface acoustic wave SAW delay line 35 with energy having frequencies relatively constant in amplitude in a band 55 to 65 MHz. This is because a rectangular pulse of amplitude A and time duration $T_p$ has a frequency spectrum $$AT_p \frac{\sin \pi T_p}{\pi T_p},$$

such spectrum being substantially "flat" over the frequency band $$f = \frac{5}{2T_p} \pm \frac{.2}{T_p}$$

The output of the surface acoustic wave (SAW) delay line 35 then is a chirp pulse having a 25.6 microsecond dispersive time. Such chirp pulse is amplitude weighted in accordance with the characteristics of the surface acoustic wave (SAW) delay line 35 to reduce sidelobes which may be generated in the pulse compression process. The frequency of the chirp pulse produced by SAW 35 is modulated from 55 megacycles to 65 megacycles in such 25.6 microsecond time duration. The output of the SAW 35 is passed to a gate 36. Also coupled to such gate 36 is line 25 from the timing and control unit 15. When line 25 is raised the output of the SAW 35 appears on line 29. As described in connection with the timing and control unit 15, and in reference to FIG. 4, the gating signal on line 25 commenced 26 microseconds after $P_m$ and remained high as the chirp pulse on line 29 here is frequency modulated from 57.5 to 62.5 MHz in a dispersive time of 12.8 microseconds. During such time, 64 radar returns associated with any one of the eight range cells are retrieved from the time compressor section 24. That is, the gating signal on line 25 allows only a portion of the chirp pulse produced by SAW 35 to pass to line 29. It follows then that the portion of such produced chirp pulse which is passed to line 29 is controlled by the contents of registers 510 and 514 of the timing and control unit 15. That is the dispersive bandwidth $K\beta$ and dispersive time $K\tau$ of the chirp pulse passed to the mixer section 30 may be controlled by selection of the contents of registers 510, 514, and also the contents of register 67, the latter register controlling the number of returns to be processed in each one of the range cells.

Mixer Section 30

Mixer section 30 includes a pair of buffer amplifiers 94, 96 each one being coupled to a different one of a pair of mixers 98, 100 as indicated. Each chirp pulse generated by the chirp pulse generator 28 is coupled to the mixers 98, 100 as indicated. It is noted that the chirp pulse coupled to mixer 98 passes through a 90° phase shifter 102 as indicated. The outputs of mixers 98, 100 are coupled to a summing network 104 as indicated to combine the signals in the in-phase and quadrature channels. The time compressed bipolar video signals out of the time compressor section 24 then appear as single sidebands on the chirp pulse.

Pulse Compressor 32

Pulse compressor 32 includes a surface acoustic wave (SAW) delay line 37 flanked by a pair of amplifiers 106, 108 as indicated. The surface acoustic wave (SAW) delay line 37 here has a compressive bandwidth 10 MHz and a compressive time 25.6 microseconds. The ratio of the compressive bandwidth to the compressive time of such SAW delay line is equal in magnitude to the dispersive bandwidth to dispersive time ratio of the SAW delay line 35 in the chirp pulse generator 28. It is noted therefore that the ratio of the compressive bandwidth of the compression filter to the "dispersive" bandwidth of the chirp pulse is here 2:1. As will be described below, such 2:1 ratio provides the maximum number of frequency resolution cells obtainable within the constraint that the frequency of the signal applied to the pulse compressor 32 is within the compressive bandwidth of such pulse compressor 32 thereby maximizing the power in the compressed pulse.

Let us consider that the SAW delay line 37 has a compressive bandwidth $\beta$ and a compressive time $\tau$; further, in order to satisfy the above stated constraint, the dispersive bandwidth of the signal applied to the pulse compressor 32 is $K\beta$ where K is equal to or less than 1. Because the dispersive time to dispersive bandwidth ratio of the chirp pulse must be equal in magnitude to $\beta/\tau$, the dispersive time of such chirp pulse must be $K\tau$. Also the time compressed video signal must likewise be $K\tau$ in time duration. The bandwidth of the frequency resolution cell should therefore be $1/K\tau$ (i.e. the 4 db bandwidth of a pulse $K\tau$ in duration). The maximum Doppler frequency of the input signal must be therefore, $\beta(1-K)$ in order for the frequency of such signal to be within the compressive bandwidth of the pulse compressor 32. Therefore, the number of Doppler cells N is equal to $\beta K \tau(1-K)$, such number being maximum when $K=\frac{1}{2}$.

As described in connection with the chirp pulse generator 28, the dispersive time duration $K\tau$ and dispersive bandwidth $K\beta$ is controlled by the gating signal on line 25 (i.e. more particularly by the contents of registers 510, 514 of the timing and control unit 15). It follows then that such gating signal controls the constant K, and for the particular embodiment described above the gating signal is 12.8 microseconds, hence $K=\frac{1}{2}$. However the value of K may be selected as desired.

Having described a preferred embodiment of this invention, other embodiments incorporating these concepts may not become apparent to those of skill in the art. For example, the amplitude weighting of the chirp pulse may be accomplished by inserting a suitable weighting amplifier between SAW 35 and gate 36 instead of having such amplitude weighting built into such SAW 35. Further, while the time compressor section 24 has been described as including analog delay lines, such section may instead have included an analog to digital (A/D) converter coupled to the quadrature phase detector 22 to convert such analog signal to corresponding digital signals and digital delay lines, i.e. shift register (or alternative digital memory) coupled to such A/D converter, the output of such digital delay lines being then coupled to analog to digital converters. As an alternative embodiment, the chirp pulse generator need not provide reference signals used in the production of time compressed signals. That is to say, any conventional chirp pulse generator could be used in place of the illustrated chirp pulse generator to be mixed with the outputs of the quadrature phase detector 22, thereby to modify the inputs to the time compressor section 24. With the alternative approach, the sweep frequency chirp generator would then be arranged to sweep 5 KHz in 12.8 milliseconds (rather than 5 MHz in 12.8 microseconds). With such an alternative approach, the sweep frequency chirp generator would be swept over its operating range only once to provide the proper input signals for the time compressor section 24 rather than, as in the preferred embodiment shown in FIG. 1, eight times to provide the proper reference signals for the mixer section 30. It is felt, therefore, that this invention should not be restricted to the disclosed embodiment but rather should be limited only by the spirit and scope of the appended claims.

What is claimed is:

1. In a radar system for producing a plurality of sets of radar returns, each one of such sets corresponding to radar returns from objects disposed in each one of a like plurality of range cells, the radar returns in each one of the sets thereof being stored at the radar system pulse repetition frequency, a signal processor for determining the Doppler frequency of the objects in each one of such range cells, comprising:
   a. time compressor means for serially retrieving each one of the plurality of sets of stored radar returns, the stored radar returns in each one of the sets thereof being retrieved at a rate greater than the radar system pulse repetition frequency and being retrieved in a time duration $K\tau$ to produce a series of time compressed signals;
   b. means, operative synchronously with the time compressor means, for serially producing a like plurality of chirp pulses, each one of such pulses having a dispersive time $K\tau$ and a dispersive bandwidth $K\beta$;

c. means for mixing each one of the time compressed signals with a corresponding one of the chirp pulses to produce a series of mixed signals; and, d. means for pulse compressing each one of the mixed signals to produce a series of pulses, each one of such pulses occurring at a time related to the Doppler frequency of any object in the range cell producing such associated radar returns.

2. The signal processor recited in claim 1 wherein the pulse compressor has a compressive bandwidth $\beta$ and a compressive time $\tau$, and where K is less or equal to 1.

3. The signal processor recited in claim 2 including means for adjusting the dispersive time of the chirp pulses.

4. A signal processor comprising:

a. means for storing N samples of a signal at a rate $R_1$ and for retrieving such N stored samples at a different rate $R_2$;

b. means for producing a frequency modulated signal;

c. means for mixing the N retrieved samples and the frequency modulated signal during a common time interval; and, d. means for pulse compressing the mixed signals.

5. The signal processor recited in claim 4 wherein the producing means includes chirp pulse means for producing a linearly frequency modulated pulse, such chirp pulse having a dispersive bandwidth $K\beta$ and such pulse compression means having a compressive bandwidth $\beta$ where K is less than or equal to 1.

6. The signal processor recited in claim 5 including means for adjusting the dispersive time $K\tau$ of the chirp pulse.

7. In a signal processor for determining the frequency of a signal, the combination comprising:

a. means for storing samples of such signal at a rate $R_1$ and for retrieving such samples at a rate $R_2$ where $R_2$ is greater than $R_1$, to produce a time compressed signal;

b. means for producing a chirp pulse;

c. means for mixing the chirp pulse with the time compressed signal; and d. means for pulse compressing the mixed signal, such pulse compressor having a bandwidth greater than the bandwidth of the chirp pulse, such compressed pulse occuring at a time related to the frequency of such signal.

8. The combination recited in claim 7 including means for adjusting the bandwidth of the chirp pulse.

9. The combination recited in claim 7 wherein the bandwidth of the pulse compressor is twice the bandwidth of the chirp pulse.

10. The combination recited in claim 8 wherein the chirp pulse producing means and the pulse compressing means each includes a surface acoustic wave delay line.

* * * * *